(12) United States Patent
Li et al.

(10) Patent No.: US 10,886,081 B1
(45) Date of Patent: Jan. 5, 2021

(54) KEYBOARD DEVICE

(71) Applicant: Chicony Electronics Co., Ltd., New Taipei (TW)

(72) Inventors: Po-Hsin Li, New Taipei (TW); Chia-Hsin Chen, New Taipei (TW); Mitsuo Horiuchi, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 16/868,823

(22) Filed: May 7, 2020

(30) Foreign Application Priority Data

Oct. 31, 2019 (TW) .............................. 108139555 A (51) Int. Cl.
| | | |
|---|---|---|
| *H01H 13/705* | (2006.01) | |
| *H01H 13/7065* | (2006.01) | |
| *G05G 5/05* | (2006.01) | |
| *G05G 1/02* | (2006.01) | |
| *B41J 5/12* | (2006.01) | |
| *B41J 5/16* | (2006.01) | |
| *G06F 3/02* | (2006.01) | |

(52) U.S. Cl.
CPC ............ *H01H 13/7065* (2013.01); *B41J 5/12* (2013.01); *B41J 5/16* (2013.01); *G05G 1/02* (2013.01); *G05G 5/05* (2013.01); *G06F 3/0202* (2013.01); *G05G 2505/00* (2013.01); *H01H 2229/042* (2013.01)

(58) Field of Classification Search
CPC ...... H01H 13/705; H01H 13/83; H01H 3/125; H01H 13/14; H01H 13/70; H01H 13/7065; H01H 2215/006; H01H 2233/07; H01H 13/52; H01H 13/20; H01H 2227/028; H01H 13/10; H01H 13/26
See application file for complete search history.

(56) References Cited

U.S. PATENT DOCUMENTS

| | | | | |
|---|---|---|---|---|
| 4,430,531 A | * | 2/1984 | Wright | ............... H01H 13/7006 200/275 |
| 5,912,443 A | * | 6/1999 | Hasunuma | ............ H01H 13/705 200/5 A |
| 8,841,569 B2 | * | 9/2014 | Liang | .................... G06F 1/1684 200/343 |
| 9,111,700 B2 | * | 8/2015 | Liu | ........................ H01H 13/52 |
| 10,409,316 B1 | | 9/2019 | Chen et al. | |
| 2004/0195082 A1 | * | 10/2004 | Takeda | ................. H01H 13/705 200/343 |
| 2018/0358193 A1 | * | 12/2018 | Chen | ..................... H01H 13/88 |

* cited by examiner

*Primary Examiner* — Ahmed M Saeed
(74) *Attorney, Agent, or Firm* — Muncy, Geissler, Olds & Lowe, P.C.

(57) ABSTRACT

The keyboard device includes a substrate, a key, a first elastic member, and a second elastic member. The substrate includes a top surface having an assembly area. The assembly area has a pivoting base including a standing portion and an extension portion extending from the standing portion. The key is liftably disposed over the assembly area. A pivoting hook is extending from the bottom of the key toward the assembly area, and one end of the pivoting hook includes a pivoting portion. The first elastic member and the second elastic member are disposed on the assembly area and elastically abutted against the bottom of the key, so that the pivoting portion is abutted against and pivoted to the extension portion, and a liftable distance is maintained between the extension portion and the bottom of the key.

12 Claims, 6 Drawing Sheets

KEYBOARD DEVICE

CROSS-REFERENCE TO RELATED APPLICATION

This non-provisional application claims priority under 35 U.S.C. § 119(a) to Patent Application No. 108139555 in Taiwan, R.O.C. on Oct. 31, 2019, the entire contents of which are hereby incorporated by reference.

BACKGROUND

Technical Field

The instant disclosure relates to an input device, and more particular to a keyboard device.

Related Art

There are various types of keyboard keys on the market. A swing-type key generally includes a key and a substrate. The key has one pivoting side and the pivoting side of the key is pivoted and fixed on the substrate. When a portion of the key away from the pivoting side is forced, the key can swing and move downwardly relative to the substrate by taking the pivoting side as the axis.

SUMMARY

However, for a clamshell-type electronic device, the configuration of the swing-type key causes the electronic device to be damaged easily when closing the lid of the electronic device. Taking a laptop as an example, when the lid of the laptop is closed, because the pivoting side of the key is fixed on the substrate and cannot move freely, the pivoting side of the key would be easily abutted against the display screen of the laptop, thereby causing the damage of the display screen due to being pressed in a long period.

In view of the above, in an embodiment of the instant disclosure, a keyboard device is provided. The keyboard device comprises a substrate, a key, a first elastic member, and a second elastic member. The substrate comprises a top surface and a bottom surface opposite to the top surface. The top surface comprises an assembly area. The assembly area has a first side and a second side opposite to the first side, and a pivoting base is protruding on the assembly area. The pivoting base is adjacent to the first side and comprises a standing portion and an extension portion, and the extension portion is extending from a top end of the standing portion and has a bottom edge. The key has a third side and a fourth side opposite to the third side. The key is liftably disposed over the assembly area, the third side corresponds to the first side, and the fourth side corresponds to the second side. A pivoting hook is extending from a bottom of the third side toward the assembly area, an end portion of the pivoting hook comprises a pivoting portion, and the pivoting portion has a top edge. The first elastic member is disposed on the assembly area and adjacent to the first side. The first elastic member is elastically abutted against the bottom of the third side of the key, so that the top edge of the pivoting portion is abutted against and pivoted to the bottom edge of the extension portion, and a liftable distance is maintained between the extension portion and the bottom of the third side of the key. The second elastic member is disposed on the assembly area and between the first elastic member and the second side. The second elastic member is elastically abutted against a bottom of the key.

Therefore, according to one or some embodiments of the instant disclosure, by applying the first elastic member elastically abutted against the third side of the key, the top edge of the pivoting portion is abutted against and pivoted to the bottom edge of the extension portion, and a liftable distance is maintained between the extension portion and the bottom of the third side of the key. Hence, when the fourth side of the key is pressed, the key can swing relative to the substrate by taking the pivoting side as the swing axis so as to trigger the signal. Conversely, when the third side of the key is pressed, the third side can be abutted against the first elastic member and moves downwardly to the substrate. Therefore, for the clamshell-type electronic device (such as a laptop), the electronic device can be prevented from being damaged by the abutting of the key when the lid of the electronic device is closed.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, same reference numbers designate identical or similar elements.

Figure 1:
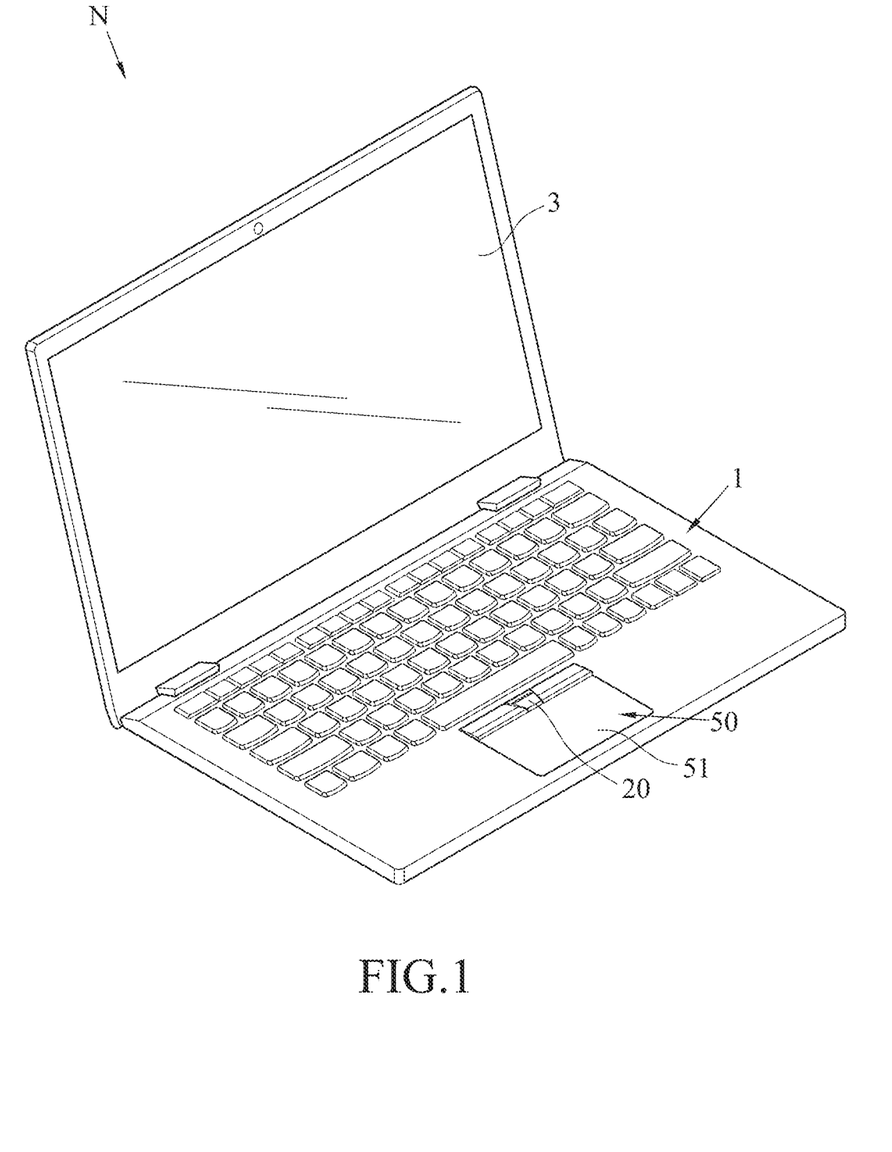
FIG. 1 illustrates a perspective view of a keyboard device according to an exemplary embodiment of the instant disclosure.
Figure 2:
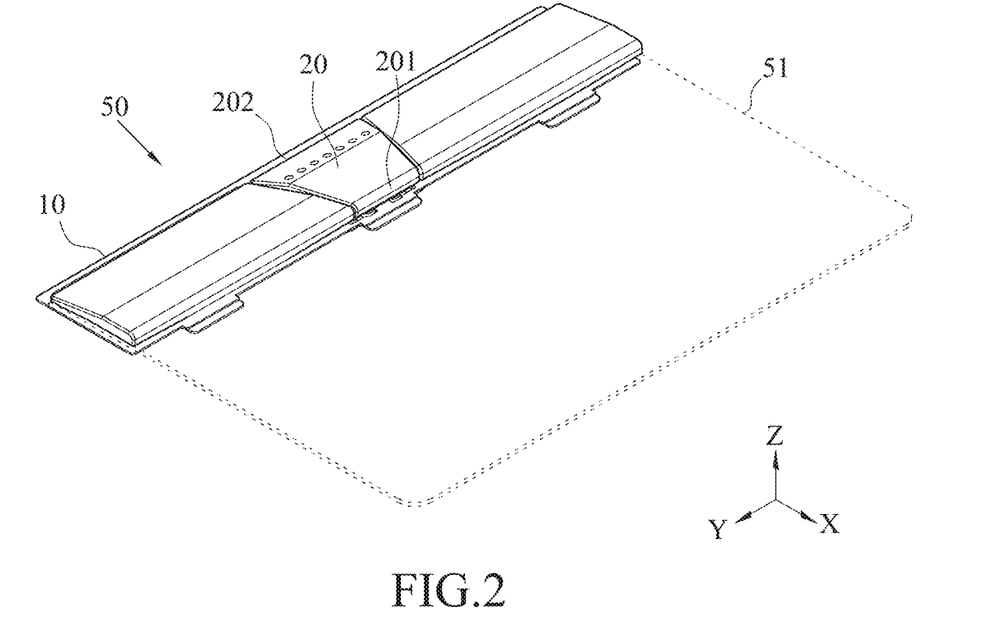
FIG. 2 illustrates a partial perspective view of the keyboard device of the exemplary embodiment.
Figure 3:
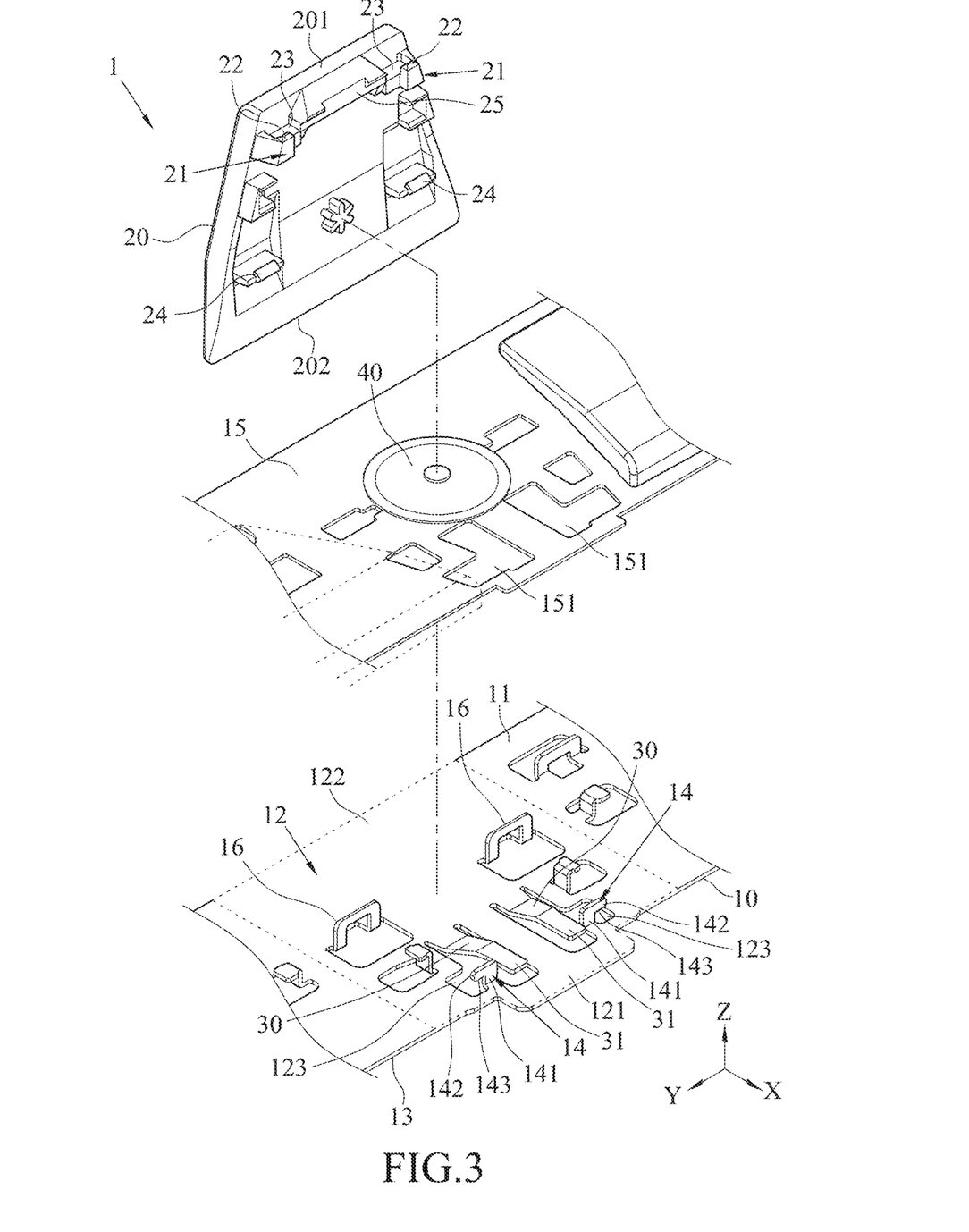
FIG. 3 illustrates a partial exploded perspective view of the keyboard device of the exemplary embodiment.

FIG. 1 illustrates a perspective view of a keyboard device according to an exemplary embodiment of the instant disclosure. FIG. 2 illustrates a partial perspective view thereof. FIG. 3 illustrates a partial exploded perspective view thereof. As shown in FIGS. 1 to 3, in this embodiment, the keyboard device 1 comprises a substrate 10, at least one key 20, a first elastic member 30, and a second elastic member 40. The key 20 is disposed over the substrate 10. The first elastic member 30 and the second elastic member 40 are elastically abutted against between the key 20 and the substrate 10. In some embodiments, the keyboard device 1 can be applied to various electronic products (as an input device of a desktop computer, a laptop or other electronic devices), so that users can press the key(s) 20 to generate corresponding signal(s).

As shown in FIG. 1, the keyboard device 1 of this embodiment is a keyboard of a laptop N and has a touchpad 50. The touchpad 50 comprises the substrate 10 and a pressure sensing plate 51 capable of sensing finger tracks (with referring to FIGS. 2 and 3). In this embodiment, the key 20 of the keyboard device 1 is a touchpad key and adjacent to the pressure sensing plate 51, and users can press the key 20 to perform a click function or to open the function menu, and so forth. But it is understood that, embodiments are not limited thereto; in some embodiments, the key 20 of the keyboard device 1 may be an alphabet key, a number key, a space key, an enter key, a caps lock key, etc., and the users can press the key 20 to input words, symbols or instructions.

As shown in FIGS. 2 and 3, the substrate 10 of the keyboard device 1 comprises a top surface 11 and a bottom surface 13 opposite to the top surface 11. The top surface 11 comprises an assembly area 12 adjacent to the pressure sensing plate 51. The assembly area 12 is an area on the substrate 10 for correspondingly assembling with the key 20 (as shown in the area surrounded by the dotted line in FIG. 3). The assembly area 12 has a first side 121 and a second side 122 opposite to the first side 121. In this embodiment, the first side 121 of the assembly area 12 is adjacent to the pressure sensing plate 151, as compared with the second side 122. In other words, the distance between the first side 121 and the pressure sensing plate 151 is less than the distance between the second side 122 and the pressure sensing plate 151, but embodiments are not limited thereto.

As shown in FIGS. 2 and 3, at least one pivoting base 14 is protruding on the assembly area 12 of the substrate 10 for assembling with of the key 20. In this embodiment, two pivoting bases 14 are protruding on the assembly area 12 of the substrate 10 and spaced with each other. In this embodiment, the two pivoting bases 14 are spaced in the Y-axis direction as shown in the figures and are aligned in the same axis, but embodiments are not limited thereto. The two pivoting bases 14 may be aligned in different axes. Each of the pivoting bases 14 is adjacent to the first side 121 of the assembly area 12 and comprises a standing portion 141 and an extension portion 142. The standing portion 141 is outwardly extending in a direction away from the substrate 10 and protruding on the top surface 11 (in this embodiment, the standing portion 141 is extending in the Z-axis direction as shown in the figures). The extension portion 142 is extending from a top end of the standing portion 141 and has a bottom edge 143. The bottom edge 143 faces the substrate 10. In this embodiment, the extension portion 142 is extending from the top end of the standing portion 141 in the Y-axis direction, but embodiments are not limited thereto. The extension portion 142 may be extending from the top end of the standing portion 141 in the X-axis direction.

In some embodiments, the substrate 10 may be a rigid plate made of metal (such as iron, aluminum, alloy, etc.), or plastic material. As shown in FIG. 3, each of the pivoting bases 14 is a hook structure formed by bending the substrate 10 integrally and upwardly (in this embodiment, the hook structure is L-shaped, but may also be U-shaped, T-shaped, etc.). In other embodiments, each of the pivoting bases 14 may be a separated member and fixed on the top surface 11 of the substrate 10 through assembly.

As shown in FIGS. 2 and 3, the key 20 has a third side 201 and a fourth side 202 opposite to the third side 201. The key 20 is disposed over the assembly area 12. The third side 201 of the key 20 corresponds to the first side 121 of the assembly area 12, and the fourth side 202 corresponds to the second side 122 of the assembly area 12. Specifically, in this embodiment, the third side 201 of the key 20 is adjacent to the first side 121 of the assembly area 12 and the pressure sensing plate 151, as compared with the fourth side 202 of the key 20. In other words, the distance between the third side 201 and the first side 121 of the assembly area 12 is less than the distance between the fourth side 202 and the first side 121 of the assembly area 12. Furthermore, the key 20 is liftably disposed on the assembly area 12. Hence, the laptop N can be prevented from being damaged by the abutting of the key 20 when the lid of the laptop N is closed. Related descriptions are provided below along with figures.

Figure 4:
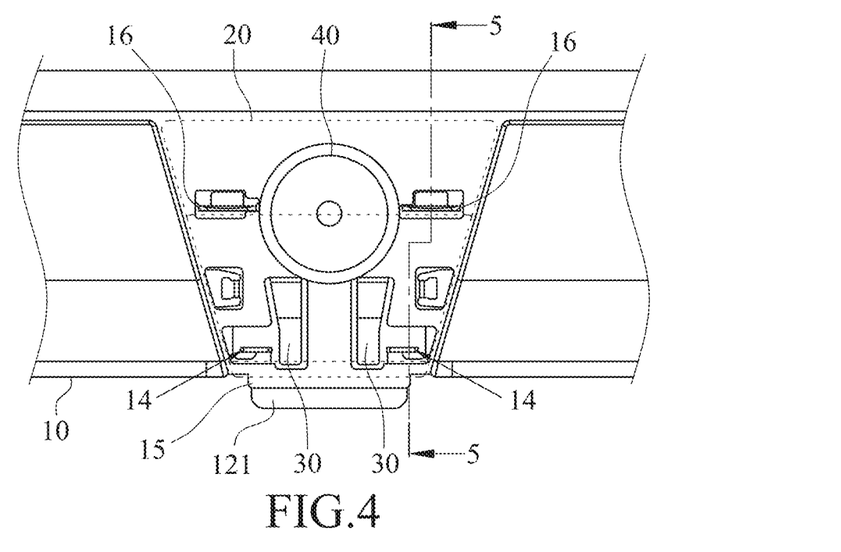
FIG. 4 illustrates a partial top view of the keyboard device of the exemplary embodiment.
Figure 5:
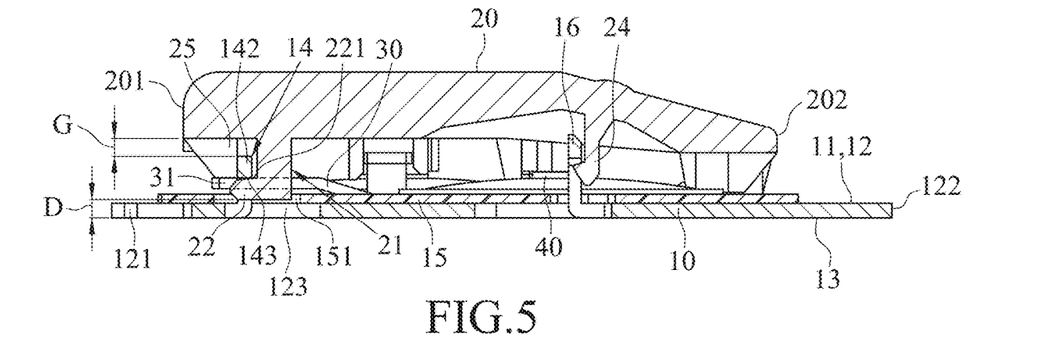
FIG. 5 illustrates a cross-sectional view of the keyboard device of the exemplary embodiment.

Reference is made to FIGS. 2 to 5. FIG. 4 illustrates a partial top view of the keyboard device according to an exemplary embodiment of the instant disclosure. FIG. 5 illustrates a cross-sectional view along line 5-5 in FIG. 4. In addition, the key 20 in FIG. 4 is presented in a perspective manner to show the structure and the cut section of the substrate 10 clearly. In this embodiment, two pivoting hooks 21 are extending from a bottom of the third side 201 of the key 20 toward the assembly area 12, and the pivoting hooks 21 are pivoted with the two pivoting bases 14 on the assembly area 12, respectively. In this embodiment, the pivoting hooks 21 are L-shaped, but may also be U-shaped, T-shaped, etc. An end portion of each of the pivoting hooks 21 comprises a pivoting portion 22, and the pivoting portion 22 has a top edge 221. In some embodiments, each of the pivoting hooks 21 and the key 20 may be integrally formed as a one-piece structure. For example, the pivoting hook 21 and the key 20 can be integrally formed as a one-piece structure through injection molding process or through other machinery processes to improve the structural strength of each of the pivoting hooks 21.

As shown in FIGS. 2 to 5, in this embodiment, the keyboard device 1 comprises two first elastic members 30 and a second elastic member 40. The two first elastic members 30 are disposed on the assembly area 12 and adjacent to the first side 121. In this embodiment, in the Y-axis direction shown in the figures, the two first elastic members 30 are between the two pivoting bases 14, but embodiments are not limited thereto. The two pivoting bases 14 may be between the two first elastic members 30, or the two pivoting bases 14 and the two first elastic members 30 may be arranged alternatively. The second elastic member 40 is disposed on the assembly area 12 and between the first elastic members 30 and the second side 122 of the assembly area 12. That is, the second elastic member 40 is adjacent to the second side 122 of the assembly area 12, as compared with the first elastic members 30. In other words, the distance between the second elastic member 40 and the second side 122 of the assembly area 12 is less than the distance between the first elastic members 30 and the second side 122 of the assembly area 12.

Figure 9:
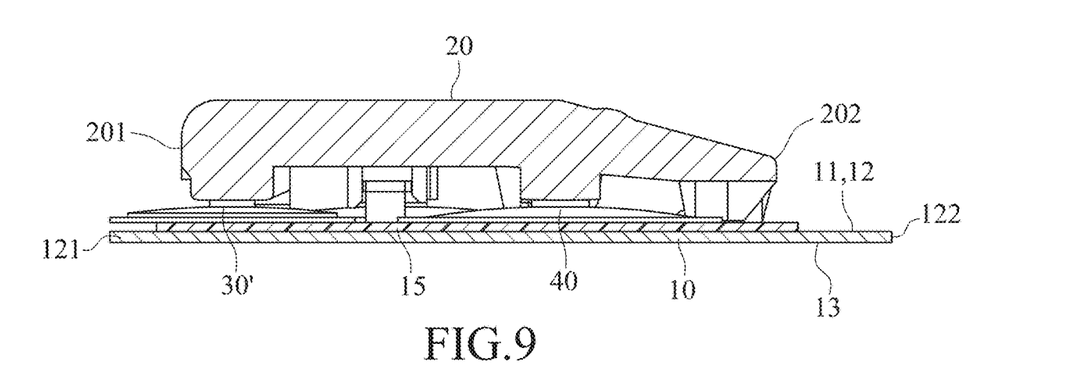
FIG. 9 illustrates a cross-sectional view of a keyboard device according to another exemplary embodiment of the instant disclosure.

As shown in FIGS. 2 to 5, in this embodiment, each of the first elastic members 30 is an elastic piece formed by bending the substrate 10 integrally and upwardly. The second elastic member 40 is a metal dome. In some embodiments, the first elastic member 30 and the second elastic member 40 may respectively be rubber domes, metal domes, springs, mechanical switches, etc., but embodiments are not limited thereto. For example, as shown in FIG. 9, a cross-sectional view of a keyboard device is illustrated according to another exemplary embodiment of the instant disclosure. In this embodiment, the first elastic member 30' and the second elastic member 40 both are metal domes or rubber domes. Furthermore, the number of the first elastic member 30 and the number of the second elastic member 40 may be set differently according to the actual product demand. For example, the number of the first elastic member 30 may be one.

As shown in FIGS. 2 to 5, the two first elastic members 30 are elastically abutted against the bottom of the third side 201 of the key 20, so that the top edge 221 of the pivoting portion 22 of each of the pivoting hooks 21 is abutted against and pivoted to the bottom edge 143 of the extension portion 142 of the pivoting base 14, thereby maintaining a liftable distance G between the extension portion 142 and the bottom of the third side 201 of the key 20. In this embodiment, the bottom of the third side 201 of the key 20 has a block 25, and the two first elastic members 30 are elastically abutted against the block 25 and indirectly abutted against the bottom of the third side 201 of the key 20, but embodiments are not limited thereto. The two first elastic members 30 may be directly and elastically abutted against the bottom of the third side 201 of the key 20. Because of the liftable distance G maintained between the extension portion 142 and the bottom of the third side 201 of the key 20, when the key 20 is pressed, the bottom of the third side 201 of the key 20 moves downward to the substrate 10, and the pivoting portion 22 of each of the pivoting hooks 21 moves downwardly at the same time to detach from the bottom edge 143 of the extension portion 142. The second elastic member 40 is elastically abutted against the bottom of the key 20 adjacent to the fourth side 202 of the key 20, so that the key 20 can be maintained at a height position by the elastic abutting of the first elastic member 30 and the second elastic member 40. Furthermore, whether the third side 201 or the fourth side 202 is pressed, the key 20 can have an up-and-down movement relative to the substrate 10. Related descriptions are provided below along with figures.

Figure 6:
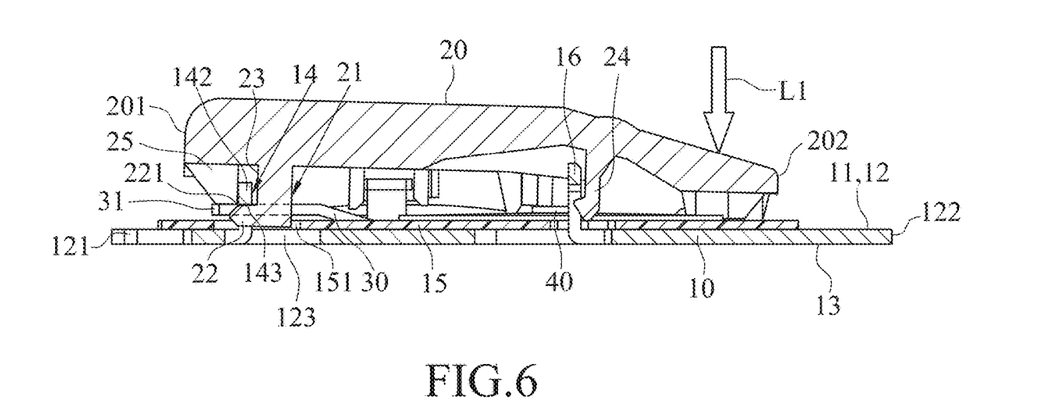
FIG. 6 illustrates a schematic operational view of the keyboard device of the exemplary embodiment.

FIG. 6 illustrates a schematic operational view of the keyboard device according to the exemplary embodiment. Please refer to FIGS. 5 and 6. When the fourth side 202 of the key 20 is pressed (as indicated by the arrow L1 shown in FIG. 6), the two first elastic members 30 are elastically abutted against the bottom of the key 20, so that the top edge 221 of the pivoting portion 22 of each of the pivoting hooks 21 of the key 20 is abutted against and pivoted to the bottom edge 143 of the extension portion 142 of each of the pivoting bases 14. Therefore, the key 20 can swing and move downwardly to the substrate 10 by taking the pivoting hook 21 as the swing axis. Moreover, the key 20 is abutted against the second elastic member 40, thereby allowing the second elastic member 40 accumulating a resilient force. A circuit board 15 may be disposed on the substrate 10. For example, the circuit board 15 may be a printed circuit board (PCB), a flexible print circuit board (FPCB), a rigid-flex PCB, etc. When the second elastic member 40 is pressed, the circuit board 15 is triggered to generate a corresponding signal. When the fourth side 202 of the key 20 is released, the key 20 can, using the resilient force provided by the second elastic member 40, swing back to the height position (the position where the key 20 is not pressed) by taking the pivoting hook 21 as the axis. Therefore, when the fourth side 202 of the key 20 is pressed, a swing-type pressing operation can be provided, thereby triggering the circuit board 15 to generate a corresponding signal.

Figure 7:
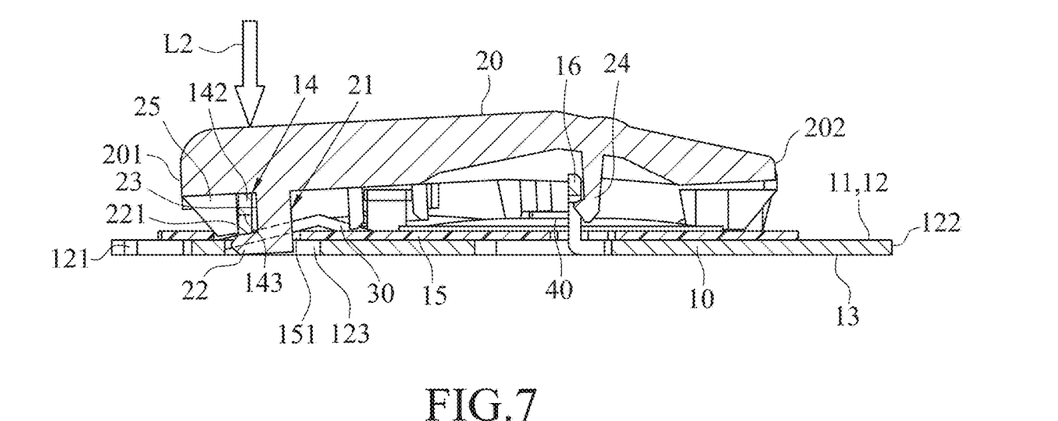
FIG. 7 illustrates a schematic operational view of the keyboard device of the exemplary embodiment.

FIG. 7 illustrates a schematic operational view of the keyboard device of the exemplary embodiment. Please refer to FIGS. 5 and 7. When the third side 201 of the key 20 is pressed (as indicated by the arrow L2 shown in FIG. 7), because of the liftable distance G maintained between the extension portion 142 of each of the pivoting bases 14 and the bottom of the third side 201 of the key 20, the third side 201 of the key 20 moves downwardly to the substrate 10, and the pivoting portion 22 of each of the pivoting hooks 21 moves downwardly at the same time to detach from the bottom edge 143 of the extension portion 142. The key 20 is abutted against the first elastic member 30, thereby allowing the first elastic member 30 accumulating a resilient force. When the third side 201 of the key 20 is released, the key 20 can, using the resilient force provided by the first elastic member 30, swing back to the height position (the position where the key 20 is not pressed), so that the top edge 221 of the pivoting portion 22 of each of the pivoting hooks 21 is resiliently abutted against and pivoted to the bottom edge 143 of the extension portion 142.

Figure 8:
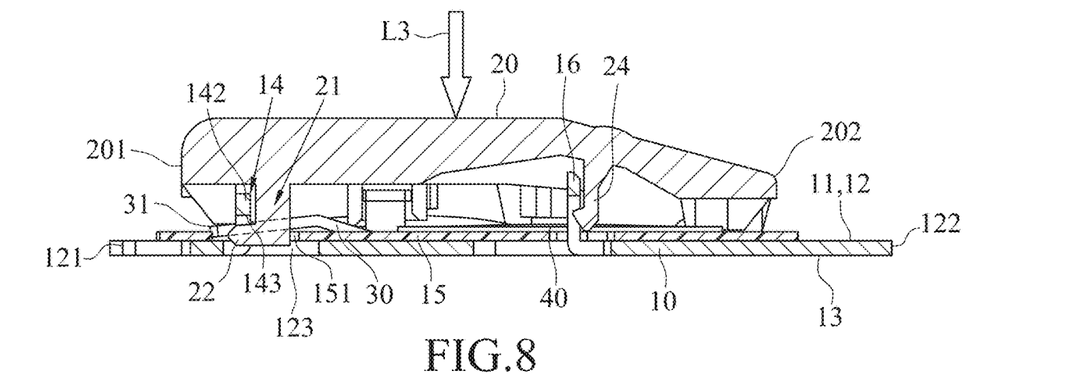
FIG. 8 illustrates a schematic operational view of the keyboard device of the exemplary embodiment.

Furthermore, FIG. 8 illustrates a schematic operational view of the keyboard device of the exemplary embodiment. As shown in FIG. 8, when a portion between the third side 201 and the fourth side 202 of the key 20 is pressed (as indicated by the arrow L3 shown in FIG. 8, where the middle portion of the key 20 is pressed), the key 20 moves downwardly to the substrate 10 and is abutted against the first elastic members 30 and the second elastic member 40, thereby allowing the first elastic members 30 and the second elastic member 40 accumulating resilient forces. Hence, the second elastic member 40 triggers the circuit board 15 to generate a corresponding signal. When the key 20 is released, the key 20 can, using the resilient forces provided by the first elastic members 30 and the second elastic member 40, swing back to the height position (the position where the key 20 is not pressed). Therefore, the key 20 can further provide a vertical-liftable pressing operation.

To sum up, the key 20 of this embodiment can provide at least two different ways for the pressing operations, such as the swing-type pressing operation shown in FIG. 6 or the vertical liftable pressing operation shown in FIG. 8, thereby generating different pressing feelings. When the third side 201 of the key 20 pivoted to the substrate 10 is pressed, the key 20 can have an up-and-down movement relative to the substrate 10. Hence, for the clamshell-type electronic device, the electronic device can be prevented from being damaged by the abutting of the key 20 when the lid of the electronic device is closed. For the laptop N shown in FIG. 1, when the display screen 3 of the laptop N is closed on the keyboard device 1, if the display screen 3 or the keyboard device 1 is further pressed, for example, if the user holds the laptop N to abut against the display screen 3, or if the laptop N is placed in the backpack and squeezed by other objects, the display screen 3 abuts against the key 20. According to one or some embodiments of the instant disclosure, whether the third side 201, the fourth side 202, or the middle portion of the key 20 is pressed, the key 20 can have an up-and-down movement relative to the substrate 10 and does not abut against the display screen 3. Therefore, the damage of the display screen 3 due to being pressed by the key 20 in a long period can be avoided.

Moreover, it is understood that, when the user holds the laptop N, the user usually tends to keep the lid of the laptop N closed and avoid the lid of the laptop from being opened, and the user thus holds one side of the laptop N near the touchpad 50. Therefore, the side of the laptop N near the touchpad 50 is more likely to be pressed, so that the key 20 on the touchpad 50 near the pressure sensing plate 51 is more often abutted against the display screen 3 of the laptop N. Hence, by configuring the key 20 of the keyboard device 1 according to one or some embodiments of the instant disclosure as a touchpad key adjacent to the pressure sensing plate 51, the display screen 3 can be prevented from being abutted by the key 20 when the lid of the laptop N is closed and pressed by an external force.

In some embodiments, as shown in FIG. 5, a distance D between the pivoting portion 22 of the pivoting hook 21 and the bottom surface 13 of the substrate 10 is greater than or equal to the liftable distance G between the extension portion 142 of the pivoting base 14 and the bottom of the third side 201 of the key 20, thereby allowing the key 20 having an enough space to move downwardly when the third side 201 of the key 20 is pressed. In some embodiments, the liftable distance G may be in the range between 0.4 mm and 0.5 mm, but embodiments are not limited thereto. The value of the liftable distance G may be configured differently, depending on the deformation amount of the applied electronic device or depending on the deformation amount of the second elastic member 40 upon the applied electronic device or the second elastic member 40 is pressed. Taking the laptop N shown in FIG. 1 as an example, if the display screen 3 or the keyboard device 1 is pressed when the lid of the laptop N is closed, the greater deformation amount of the display screen 3 or the keyboard device 1, the greater value of the liftable distance G to increase the liftable range of the key 20, thereby avoiding the interference or squeezing between the display screen 3 and the key 20.

As shown in FIGS. 3 and 5, the assembly area 12 of the substrate 10 further comprises a plurality of avoidance holes 123. Each of the avoidance holes 123 is defined through the top surface 11 and the bottom surface 13 and corresponds to each of the pivoting hooks 21. The circuit board 15 has a plurality of through holes 151, and each of the through holes 151 corresponds to and communicates with each of the avoidance holes 123. Therefore, as shown in FIG. 7, when the third side 201 of the key 20 is pressed and moves downwardly, the pivoting portion 22 of each of the pivoting hooks 21 can pass through the corresponding through hole 151 and the corresponding avoidance hole 123, to avoid hitting the circuit board 15 and the substrate 10. Moreover, the liftable distance G is not limited in design, so that the third side 201 of the key 20 has a greater liftable range to be suitable for products with different deformation amounts.

As shown in FIGS. 3 and 7, in one embodiment, the bottom of the third side 201 of the key 20 further comprises two liftable guide slots 23, and the two pivoting base 14 are received in the two liftable guide slots 23, respectively. When the third side 201 of the key 20 performs the up-and-down movement, the key 20 can be guided by the liftable guide slots 23 to make the movement more stable and to avoid the key 20 from shaking.

As shown in FIGS. 3 and 5, in this embodiment, each of the first elastic members 30 comprises an abutting portion 31 elastically abutted against the bottom of the third side 201 of the key 20. In this embodiment, each of the first elastic members 30 is an elastic piece formed by bending the substrate 10 integrally and upwardly. The abutting portion 31 is at the extension end of the first elastic member 30, and the pivoting portion 22 of the pivoting hook 21 is between the abutting portion 31 of the first elastic member 30 and the second elastic member 40. Therefore, when the fourth side 202 of the key 20 is released after being pressed, the key 20 can swing back to the height position using the resilient force provided by the second elastic member 40. Based on the lever principle, the third side 201 of the key 20 downwardly presses the abutting portion 31 of the first elastic member 30 to generate a reaction force to make the key 20 slightly forced upon the key 20 moves and swings upwardly. Hence, the key 20 can be prevented from having an excessive swing force to impact on other components on the substrate 10, thereby achieving the advantages of component damage prevention and noise reduction.

For example, as shown in FIGS. 3 and 5, in this embodiment, the assembly area 12 of the substrate 10 further comprises two first hook members 16, and the two first hook members 16 are adjacent to the second side 122 of the assembly area 12. The fourth side 202 of the key 20 further comprises two second hook members 24, and the two second hook members 24 are extending toward the assembly area 12. In this embodiment, the two first hook members 16 are hook structures respectively formed by bending the substrate 10 integrally and upwardly. In this embodiment, the hook structure is U-shaped, but may also be L-shaped or other shaped. The two second hook members 24 are barbs formed by protruding the bottom of the key 20 integrally. The fourth side 202 of the key 20 is elastically abutted against the second elastic member 40 to make the first hook members 16 and the second hook members 24 be hooked with each other, so that the key 20 does not swing upwardly and detach from the substrate 10 easily when the key 20 is not pressed. As shown in FIG. 6, when the fourth side 202 of the key 20 is pressed and moves downwardly, the second hook members 24 move downwardly at the same time so as to detach from the first hook members 16 temporarily. During the fourth side 202 of the key 20 is released and swings upwardly, the third side 201 of the key 20 downwardly presses the abutting portion 31 of the first elastic member 30 to generate a reaction force to make the key 20 slightly forced upon the key swings, thereby decreasing the impact force between each of the first hook members 16 and each of the second hook members 24 to prevent component damage and to reduce noise.

In some embodiments, the first hook members 16 may be barbs formed by protruding the top surface 11 of the substrate 10 integrally, and the two second hook members 24 may be barbs formed by protruding the bottom of the key 20 integrally, but embodiments are not limited thereto. Furthermore, the number of the first hook members 16 and the number of the second hook members 24 may be configured differently according to the actual product demand. For example, the number of the first hook members 16 and the number of the second hook members 24 may be one.

Therefore, according to one or some embodiments of the instant disclosure, elastic members are provided at a pivoting side of the key which is pivoted with the substrate, a liftable distance is maintained between the key and the substrate, and the elastic members are elastically abutted against the key. When the key is pressed, the pivoting side of the key can abut against the elastic members move downwardly to the substrate. For a clamshell-type electronic device (such as a laptop), an assembly (such as a display screen) of the electronic device can be prevented from being damaged due to being pressed by the key when the lid of the electronic device is closed.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. A keyboard device, comprising:
    a substrate comprising a top surface and a bottom surface opposite to the top surface, wherein the top surface comprises an assembly area, the assembly area has a first side and a second side opposite to the first side, and a pivoting base is protruding on the assembly area; the pivoting base is adjacent to the first side and comprises a standing portion and an extension portion, and the extension portion is extending from a top end of the standing portion and has a bottom edge;

a key having a third side and a fourth side opposite to the third side, wherein the key is liftably disposed over the assembly area, the third side corresponds to the first side, and the fourth side corresponds to the second side;

a pivoting hook is extending from a bottom of the third side toward the assembly area, an end portion of the pivoting hook comprises a pivoting portion, and the pivoting portion has a top edge;

a first elastic member disposed on the assembly area and adjacent to the first side, wherein the first elastic member is elastically abutted against the bottom of the third side of the key, so that the top edge of the pivoting portion is abutted against and pivoted to the bottom edge of the extension portion, and a liftable distance is maintained between the extension portion and the bottom of the third side of the key; and a second elastic member disposed on the assembly area and between the first elastic member and the second side, wherein the second elastic member is elastically abutted against a bottom of the key.

2. The keyboard device according to claim 1, wherein a distance between the pivoting portion and the bottom surface of the substrate is greater than or equal to the liftable distance.

3. The keyboard device according to claim 2, wherein the substrate further comprises a circuit board, the circuit board has a through hole, and the through hole corresponds to the pivoting hook.

4. The keyboard device according to claim 3, wherein the assembly area of the substrate further comprises an avoidance hole, the avoidance hole is defined through the top surface and the bottom surface and corresponds to the through hole.

5. The keyboard device according to claim 1, further comprising a touchpad, wherein the touchpad comprises the substrate and a pressure sensing plate, the key is adjacent to the pressure sensing plate.

6. The keyboard device according to claim 5, wherein the third side of the key is adjacent to the pressure sensing plate, as compared with the fourth side.

7. The keyboard device according to claim 1, wherein the bottom of the third side of the key further comprises a liftable guide slot, and the pivoting base is received in the liftable guide slot.

8. The keyboard device according to claim 1, wherein the first elastic member comprises an abutting portion elastically abutted against the bottom of the third side of the key, the pivoting portion of the pivoting hook is between the abutting portion and the second elastic member.

9. The keyboard device according to claim 1, wherein the assembly area further comprises a first hook member, the first hook member is adjacent to the second side, the fourth side of the key further comprises a second hook member, the first hook member and the second hook member are hooked with each other.

10. The keyboard device according to claim 1, wherein the first elastic member is an elastic plate.

11. The keyboard device according to claim 10, wherein the first elastic member is formed by bending the substrate integrally and upwardly.

12. The keyboard device according to claim 1, wherein the liftable distance enables the third side of the key to be pressed down toward the substrate and be abutted against the first elastic member.

* * * * *